(12) United States Patent
Shah

(10) Patent No.: US 7,469,172 B2
(45) Date of Patent: Dec. 23, 2008

(54) WIRING DIAGRAM WITH WIRE COLORS

(75) Inventor: Hemang Shah, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 526 days.

(21) Appl. No.: 11/197,546

(22) Filed: Aug. 5, 2005

(65) Prior Publication Data
US 2007/0032207 A1  Feb. 8, 2007

(51) Int. Cl.
*G06F 7/00* (2006.01)
(52) U.S. Cl. .......................... 701/29; 701/36
(58) Field of Classification Search ................. 701/29, 701/33, 36; 716/15; 174/72 R, 72 A; 324/503
See application file for complete search history.

(56) References Cited
U.S. PATENT DOCUMENTS 6,236,917 B1   5/2001  Liebl et al.
6,457,165 B1 * 9/2002  Ishikawa et al. .............. 716/12
6,526,340 B1   2/2003  Reul et al.
6,823,243 B2  11/2004  Chinnadurai et al.
6,874,680 B1   4/2005  Klaus et al.

OTHER PUBLICATIONS

"Solarity—Drivability and Component Test Diagnostic Tool", SPX OTC, 2004, 4 pages.
"Scope/Infotech User Guide—Vehicle Entry", SPX OTC, Sep. 15, 2000, 135 pages.

* cited by examiner

*Primary Examiner*—Yonel Beaulieu
(74) *Attorney, Agent, or Firm*—Baker & Hostetler LLP

(57) ABSTRACT

A computerized method and apparatus for displaying in an automotive scan tool a wiring diagram of a vehicle. The method includes generating a wiring diagram image corresponding to a vehicle component and a vehicle module having at least one wire therebetween. The method further includes controlling a display device so as to display the wiring diagram in which the least one wire being displayed as a color graphic. The method can be embodied in a scan tool configured for automotive diagnostics.

16 Claims, 5 Drawing Sheets

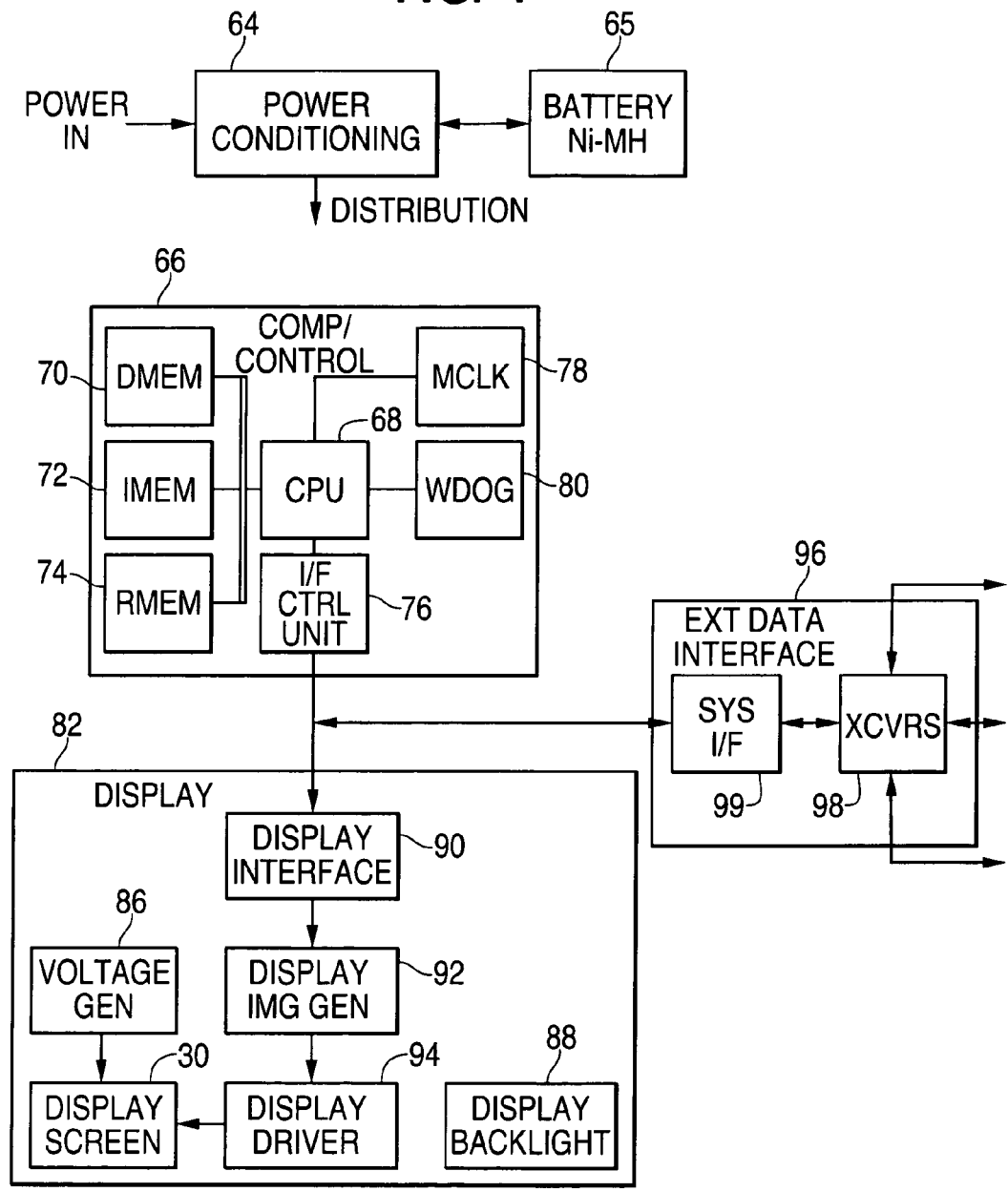

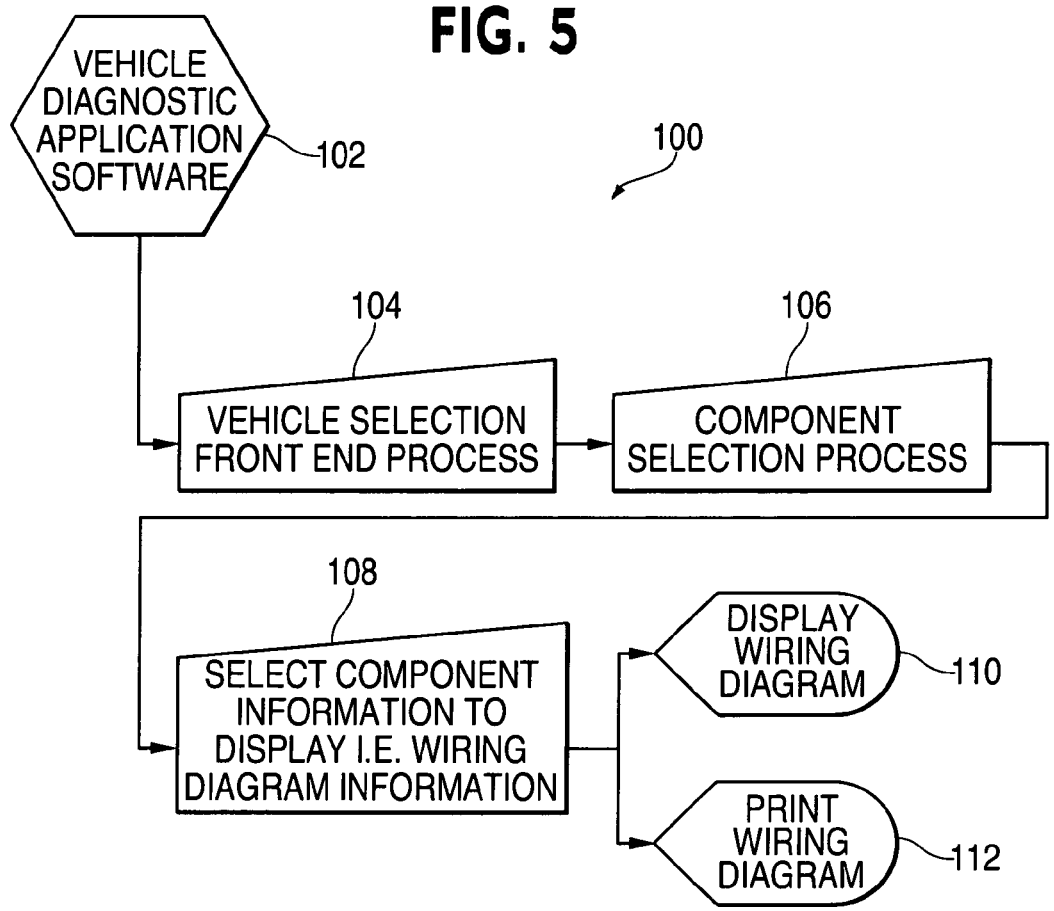

WIRING DIAGRAM WITH WIRE COLORS

FIELD OF THE INVENTION

The present invention relates generally to the field of automotive diagnostics. More particularly, the present invention relates to a portable device designed to provide a user with a display of a wiring diagram in which the wires are shown in color graphics corresponding to the colors of the physical wires between the automotive components of the vehicle being diagnosed.

BACKGROUND OF THE INVENTION

Historically, diagnostic evaluation of a vehicle control system was performed by using designated, generally stand-alone-type testing equipment that was coupled to the specific vehicle's control system. Vehicle control systems have become more computerized with electronic control units being installed in motor vehicles. These control units include one or more micro-controllers which are used to control operation of a variety of vehicular control systems, such as the engine, transmission, brakes or the steering mechanism.

Today in the automotive industry, there are hand-held diagnostic testers or tools used in connection with motor vehicle maintenance and repair. For instance, hand-held diagnostic tools have been used to trouble-shoot faults associated with vehicular control units. Typically such tools have included a micro-processor and an interface circuit to facilitate communication between the vehicle's electronic control unit and the tool's micro-processor. Each diagnostic tool can also included non-volatile internal or external memory, such as a plug-in module, that stores various vehicle component data to provide information to a user. For example, a few of these scan tools can provide a user with schematic wiring diagrams for specific automotive components associated with a given make of vehicle. However, none of the scan tools available to date display the schematic wiring diagram with the wires in color graphics so as to correspond to the actual wire colors between components. Instead, these wiring diagrams are monochrome or grayscale graphics that provide textual indicators, for example, a color code, as to the color of a wire. However, this method of color indicia can be misleading or at least confusing to the automotive technician, because the technician may have to refer to a manual or rely on an assumption to interpret a given color code. Confusion or misinterpretation can lead to misidentification of problem wires and therefore improper diagnosis. This confusion can further lead to delays in repair of the vehicle.

Accordingly, it is desirable to provide a method and apparatus to provide a scan tool capable of displaying wiring diagrams with the wires shown in color graphics corresponding to the colors of the physical wires connecting the automotive components being diagnosed. Such a wiring diagram can provide for quick, easy and accurate identification of wires which in turn can lead to more efficient repair time and a reduction in diagnostic errors.

SUMMARY OF THE INVENTION

The foregoing needs are met, to a great extent, by the present invention, wherein in one aspect an apparatus and method provide for a portable device or scan tool capable of displaying wiring diagrams with the wires shown in the colors corresponding to colors of the physical wires connecting the automotive components being diagnosed.

In accordance with one embodiment of the present invention, a computerized method provides for displaying a wiring diagram of a vehicle in a display device of an automotive diagnostic tool. More specifically, the method comprises generating a wiring diagram image corresponding to a vehicle component and a vehicle module having at least one wire therebetween. In addition, the method includes controlling the display device so as to display the image such that the at least one wire can be displayed as a color graphic. In one embodiment of the method, the generating an image includes providing a bitmap image of the wiring diagram. Alternatively in another embodiment, the generating an image includes dynamically generating the image.

In a preferred embodiment, the generating an image includes providing a database of wiring data for vehicles in which the wiring data can identify a vehicle component, a vehicle module, and a wire therebetween having a color, the database further identifying the color. The method further includes selecting wiring data from the database and displaying the selected data in a display device. Accordingly, the displaying includes presenting the wire as a color graphic corresponding to the identified color from the selected wiring data.

Another embodiment according to the present invention provides a system for displaying a wiring diagram of a vehicle. The system comprises a display device for an automotive diagnostic tool, the display device being configured to display a wiring diagram image corresponding to a vehicle component and a vehicle module having a wire therebetween. The wiring diagram image can be configured to display the wire as a color graphic. In yet another embodiment, the system can further comprise a storage device configured to store data corresponding to the image and a processor coupled to the storage device and the display device. The processor can be configured to control the display device for displaying the image. The storage device can be configured to store the data as a bitmap image or alternatively, the processor is coupled to the storage device and configured to so as to dynamically generate the wiring diagram image for display on the display device.

Another embodiment according to the present invention provides for a computer product for displaying a wiring diagram of a vehicle in display means of an automotive diagnostic tool. The computer product comprises a computer readable storage means having computer readable program code means embodied in the storage means for performing a method. The method comprises generating an image of a wiring diagram corresponding to a vehicle component and a vehicle module having a wire therebetween, and controlling the display means to display the image with the wire being displayed as a color graphic. The computer-readable storage means can store a data structure comprising a first field containing data representing a vehicle component, a second field containing data representing a vehicle module, a third field containing data representing a wire connection between the first and second fields, and a fourth field containing data representing color derived from the third field. Moreover, the method can further include converting the data of the fourth field into data for display as the color graphic, and selecting wiring data from the database can include providing a user interface to receive a user input. The method can provide for responding to the input so as to select the data. The computer-readable storage means can be a CD, flash drive, storage device coupled to a network or any combination thereof. In addition, the computer readable storage means can be a storage device coupled to a scan tool.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is a block diagram showing the exemplary functional units of the present invention in which computer programs and computer program products according to the claimed invention may be implemented.

FIG. 5 is a flow chart that includes the steps in generating a wiring diagram in accordance with one embodiment of the method or process.

DETAILED DESCRIPTION

An embodiment in accordance with the present invention provides a computerized apparatus and method for displaying a wiring diagram of a vehicle. More specifically, the apparatus and method provide for displaying the wiring diagram in which the wires are schematically shown with color graphics preferably corresponding to the colors of the physical wires connecting the automotive components. The method includes generating a wiring diagram image corresponding to or depicting a wired connection between a vehicle component and a vehicle module having a wire therebetween. The method further includes controlling or communicating with a display device to display the wiring diagram in which the wire being displayed is in color graphics or true color graphics. "Color" or "color graphics" is being used herein throughout to mean graphics in other than monochrome or grayscale. The color displayed can correspond directly to the color of wire used between a vehicle component and module of a factory assembled vehicle. In such an embodiment, the displayed wiring diagram can provide a graphical depiction of an actual or "real-world" vehicle electrical assembly.

Figure 1:
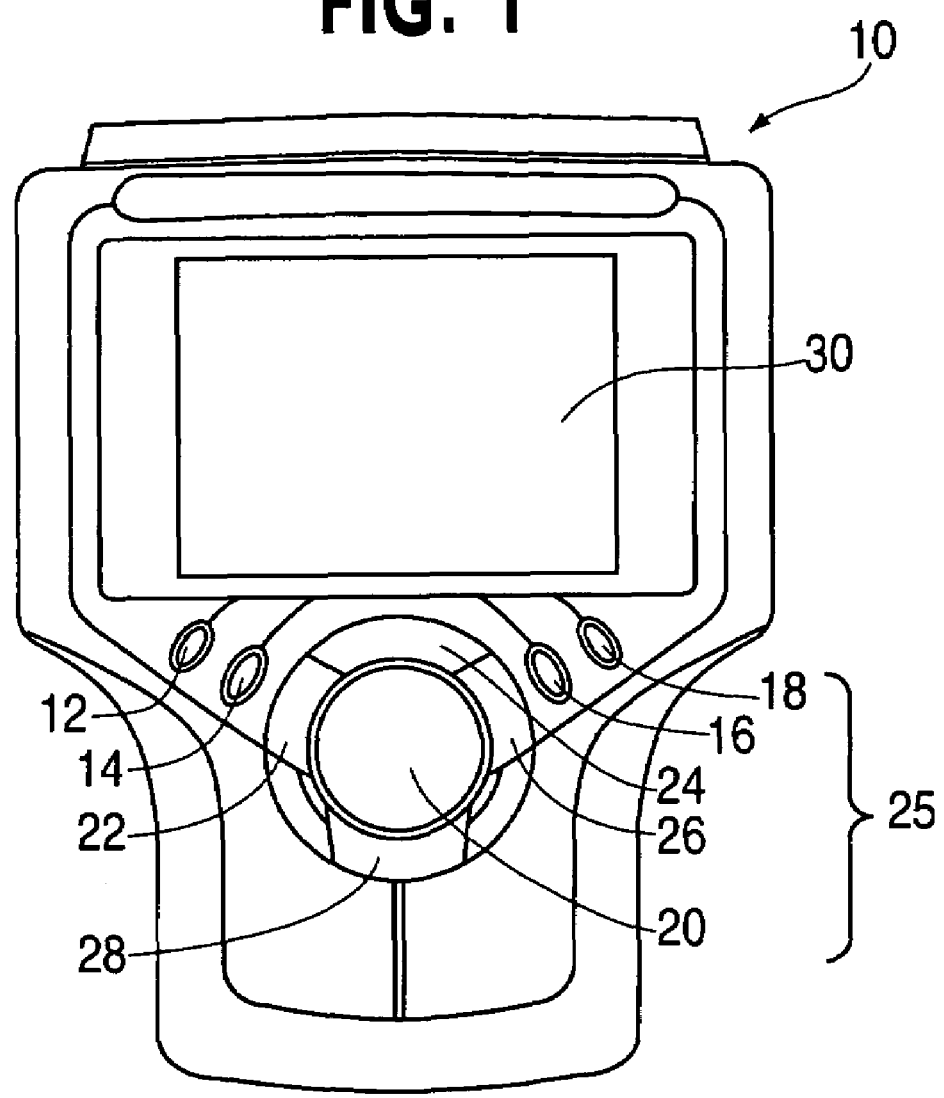
FIG. 1 is a front view of a diagnostic tool according to a preferred embodiment of the present invention.

Shown in FIG. 1 is an illustrative example of a portable device or handheld scan tool 10 according to the present invention for use as an automotive diagnostic tool. Scan tool 10 can be configured with a connector to interface with a vehicle's on-board diagnostic (OBD) electronics, collect and store vehicle manufacturing and test data, and display such stored information to an automotive technician or user. Scan tool 10 includes a graphics device or display panel 30 which can be dimensioned and configured to afford ease of viewing data. In addition, display panel 30 can be a full-color display screen capable of true color presentation. Display panel 30 can have the facility to present character, numeric and/or graphic information. Moreover, display panel 30 can be, for example, a VGA monitor, LCD or any other display monitor. Alternatively, the display panel 30 can be separate from and in communication with scan tool 10 so as to be, for example, a stand alone monitor or a monitor of a personal computer (PC), laptop computer, handheld device or other computer device having a monitor. Communication between the scan tool 10 and a separate monitor or display 30 can be provided by cable or wireless communication. For example, the scan tool 10 can communicate with the display 30 by way of a RS-232 cable connection, or alternatively, by wireless communication using a 802.11b wireless port.

Scan tool 10 can be further configured or programmed to execute automotive diagnostic routines or other computerized programs. In order for a user to initiate, navigate and/or respond to the routines or programs, scan tool 10 can be configured with buttons or keys 12, 14, 16, 18, 20, 22, 24, 26 and 28, collectively user interface 25, which provides for a user interface for user interaction and responses to prompts from, for example, a computer program of the present invention discussed herein. More particularly, user interface 25 can be used to navigate a series of drop down menus presented in the display 30 and/or to enter in user selections in response to presented user prompts.

Figure 2:
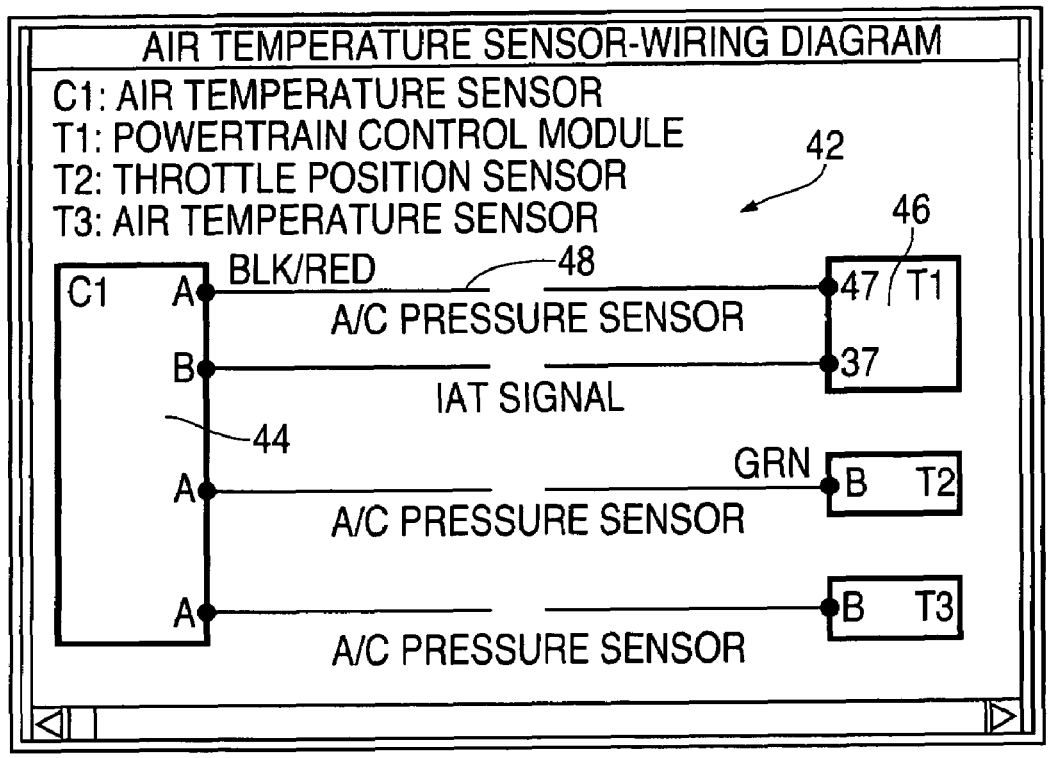
FIG. 2 is an exemplary screen shot of a grayscale wiring diagram between automotive components as displayed by automotive scan tools known in the art.

FIG. 2 shows a prior art snap shot 40 of an exemplary wiring diagram 42 capable of being displayed in a graphics device, for example, display panel 30 of scan tool 10. More specifically, scan tools known in the art that are capable of providing a user with the wiring diagram 42, present the wiring diagram 42 in monochrome or grayscale format. As schematically seen in wiring diagram 42, automotive components, for example, air temperature sensor 44 and power control module 46 are shown having connected therebetween a wire 48 collectively associated with the "A/C Pressure Sensor." Wire 48 is shown as including a textual color indicia or color code, for example, "BLK/RED," that is supposed to correspond to the actual color of the physical wire between the automotive components 44, 46 of the vehicle being diagnosed. The user, addressing a problem with, for example, the "A/C Pressure Sensor" would rely on the "BLK/RED" or other textual or numerical indicia to identify the wire for inspection. Alternatively, where other indicia may be used, for example, a numeric code, the user may be forced to refer to a user manual to translate the color indicated in the wiring diagram in order to identify the wire to be inspected.

Figure 3:
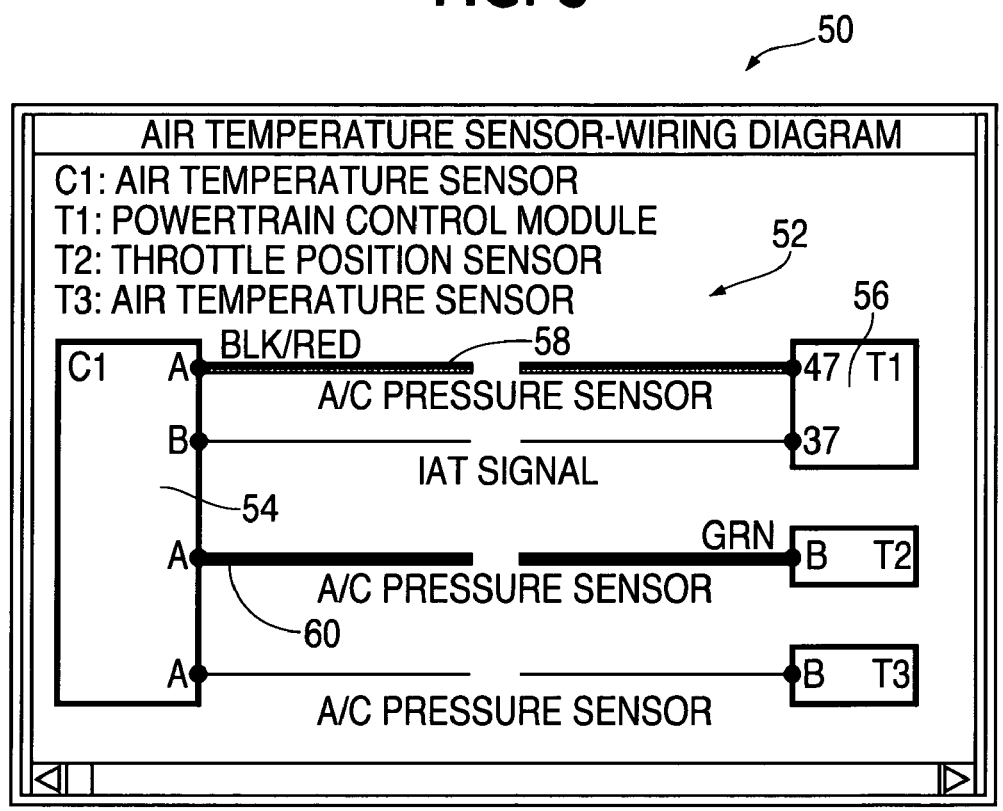
FIG. 3 is a screen shot of an automotive component wiring diagram according to the present invention.

To overcome the disadvantage or inconvenience of relying solely on textual color indicators in wiring diagrams, an embodiment of the present invention provides for a wiring diagram in which the wires are presented in color graphics. More specifically, the color graphics can provide a mechanism to more readily and accurately identify wire colors, and potentially provide for quicker identification of wired components. Referring now to FIG. 3, shown is a snap shot 50 of an exemplary wiring diagram 52 presented in the display panel 30 as generated by a method and apparatus according to the present invention. Wiring diagram 52 schematically represents automotive components, for example, air temperature sensor 54 and power control module 56 having connected therebetween a wire 58 collectively associated with the "A/C Pressure Sensor." As shown, wire 58 is presented to the user as a color graphic, for example, as Black/Red so as to correspond or match the actual color of the physical wire between the automotive components, more particularly the sensor and module, of the vehicle being diagnosed. It is to be understood that additional wires and different colors can be displayed as color graphics so as to sufficiently and accurately convey to the user the necessary wiring diagram information. For example, in addition to wire 58, wiring diagram 52 can present wire 60 as a color graphic having the color green. Scan tool 10 can be further configured for print capability, for example, scan tool 10 can include a USB port, RS-232 serial port or other port to connect to an external printer capable of true color printing for generating a print out of the wiring diagram 52 in color for reference by the user.

Portable diagnostic tools such as, for example, scan tool 10 function with an internal operating system that accesses software programs in the form of diagnostic routines. These operating systems and software programs can be installed at the time of the manufactured assembly of scan tool 10 or alternatively, the operating systems and software programs can be uploaded and/or updated in the scan tool 10 by way of a CD, flash memory or other external storage device having the operating system and/or software programs loaded thereon and connected to the scan tool 10. In addition, the operating system and/or software programs can be downloaded from a network, for example, a WAN, LAN or Internet and subsequently uploaded to the scan tool 10.

A method according to the present invention for presentation on display panel 30 of a wiring diagram 52 having schematic wires displayed as color graphics or at least true color graphics can be embodied in a software program capable of being installed on a portable device such as, for example, scan tool 10. Such a software program can be configured to be installed and operate on multiple platforms of existing portable diagnostic tools. Shown in FIG. 4 is an illustrative block diagram of the electronic circuitry of scan tool 10 configured for installation of a software or computer program in accordance with the present invention. Shown in FIG. 4, scan tool 10 can include a power-input subsystem 64 which can accept available DC, for example, via the battery 65 and convert it to the voltages needed for all other subsystems within the scan tool 10. A computational subsystem 66 can include a central processing unit 68, a dynamic data memory area 70, a preprogrammed instruction memory area 72, a reprogrammable instruction and data area or storage device 74, an interface control unit 76, a master clock 78, and a watchdog timer 80, which can execute all functions of scan tool 10 including, for example, a software program configured for computer control of display panel 30 to generate and present a wiring diagram 52 having schematic wires displayed at least as color graphics as previously described and in accordance with a method of the present invention. Coupled to or in communication with computational subsystem 66 is display subsystem 82 that includes display screen 30, and can further include a dedicated display voltage generator 86, a backlight voltage generator 88, a display interface unit 90, a display image generator 92, and a display driver 94, which further can accept, store, and display data generated by the computational subsystem 66, for example, wiring diagram 52 of FIG. 3. The display subsystem 82 can include the necessary drivers, devices and ports for communication with the display 30 where the display 30 is a standalone monitor separate from the scan tool 10 or is otherwise a monitor for a separate computer device such as, for example, a PC.

Referring back to FIG. 4, scan tool 10 can include an external data interface unit 96 that can further include a set of transceivers 98 and a dedicated data interface processor 99 which can receive digital data from any external test instrument which can be installed or coupled to scan tool 10 and which may further require dedicated handshaking. The external data interface unit 96 can present this data to the computational subsystem 66 for collation and processing. The external data interface unit can further transmit digital handshaking and control data as the external test instrument may require in order to continue providing measurements.

Referring now to FIG. 5, shown is a flowchart 100 of the method according to the present invention which can be computerized or implemented in a software program for installation in a scan tool 10 or alternatively stored on a computer readable medium for updating automotive diagnostic tools via separate installation procedure. Generally, the method provides for user selection of vehicle and specific automotive components from which the program can dynamically generate the wiring diagram 52 or otherwise generate a bitmap image of the wiring diagram 52. As shown in FIG. 5, operation begins with basic initialization 102. A Vehicle Selection Front End Process 104 (VS Process) step provides for identification the vehicle under test through a process which can combine the user interface 25 and a lookup data table presented in the display 30. More specifically scan tool 10 can employ user prompts substantially similar to those used in existing scan tools to date which provide for user selection and display of monochrome or grayscale wiring diagrams, such as for example, the SOLARITY automotive diagnostic tool by SPX Corporation using INFOTECH vehicle feature coverage software.

For example, VS Process 104 software can guide a user through interpretation of the characters of the vehicle identification number (VIN), such as an "F" in the second position indicating a Ford or a "G" in the tenth position representing the year 1986. For each of several combinations of position and data value, the VS Process 104 permits the operator to compile a description of the vehicle under diagnosis. Alternatively, process step 104 can permit, the user to key in a vehicle identification number (VIN) and the scan tool 10 can determine, for example, the manufacturer, body style, year of manufacture, engine type, emissions controls, manufacturer provided wiring diagrams data, and other details concerning that vehicle, all of which may be stored in the reprogrammable instruction and data area 74 of scan tool 10 in a database or other data structures.

More specifically, the manufacturer provided wiring diagram data can include vehicle component data, vehicle module data and wire connection data such as pin connection and codes identifying wire colors. Manufacturer provided wiring diagram data can further include vehicle component or module locations, performance specifications and other technical specifications. Moreover, the manufacturer provided wiring diagram data can be stored in data area 74. Alternatively, the manufacturer provided wiring diagram data may reside in memory 70, an external storage device such as a compact flash card or other computer readable medium that is remotely accessible.

Referring again to FIG. 5, shown is component selection process 106 in which a user can select, through a user interface such as user interface 25, a component for analysis. The program can be further configured with specific component information selection process 108 for a user to select through the user interface specific component information to be presented on display panel 30, for example, the user can select any one element of the manufacturer provided wiring diagram data as stored in area 74. Using the stored manufacturer provided wiring diagram data, the program can be configured or provided with an algorithm to generate a wiring diagram 52 dynamically or statically. In one embodiment, the program can be configured so as to convert manufacturer provided data having wire color codes or other indicia so as be able to generate the schematic wires as color graphics. The program can be further configured to provide instructions to display 30 of display subsystem 82 via the computational subsystem 66 so as to present the wiring diagram 52 as indicated by display process 110. The display process 110 can include, or alternatively provide, instructions to remotely display the wiring diagram 52 to a standalone monitor or other computer monitor where for example, the display 30 is a monitor for a PC.

Alternatively or in addition to, instructions may be provided to an external printer having true color graphics capability (not shown) via the computational subsystem 66 to generate a print out of the wiring diagram for user reference in color hard copy format as indicated by print process 112. In another embodiment display and/or print out of the wiring diagram 52 may be automatically provided by the program in response to anyone of process steps of flowchart 100. In yet another embodiment, the program may be configured such that any one of process steps of 100 may be alternatively initiated by input received by scan tool 10 from an interface with a vehicle's OBD electronics so as to display and/or print out wiring diagram 52.

In an alternate embodiment of the method, the method can be embodied in a software program for installation on a computer device in communication with the scan tool 10 such as, for example, a PC or laptop computer having a monitor capable of true color graphics. The monitor of the computer can be the display 30 of the scan tool 10 or otherwise provide another display device. The software program running on the computer device can be configured to establish communication with the scan tool 10 and capture or download the data displayed on the scan tool 10 to the computer. The software program can be further configured to display the captured data on the monitor of the computer. More specifically, the software program can capture wiring diagram data from the scan tool data to display a wiring diagram 52 on the monitor of the computer. In one embodiment the software program can be configured to capture the wiring data from the scan tool 10 and generate the wiring diagram 52 statically or dynamically. The software program can control or instruct the monitor of the computer to display the generated wiring diagram 52.

A scan tool configured in accordance with the present invention can address one or more of the disadvantages of available scan tools which present wiring diagrams in monochrome or gray scale. More specifically, as discussed above, a scan tool configured in accordance with the present invention can present a wiring diagram in which the schematic wires are shown as color graphics so as to make the color identification of wires easier and more accurate. The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computerized method for displaying a wiring diagram of a vehicle in a display device of an automotive diagnostic tool, the method comprising:
    generating an image of a wiring diagram corresponding to a vehicle component and a vehicle module having at least one wire therebetween;
    controlling the display device so as to display the image, the at least one wire being displayed as a color graphic;
    providing a database of wiring data for vehicles, the wiring data identifying a vehicle component, a vehicle module, and at least one wire therebetween having a color, the database further identifying the color; and
    selecting wiring data from the database for display,
    wherein further the controlling the display device includes controlling the device so as to display the image having a vehicle component, vehicle module and at least one wire therebetween corresponding to the selected wiring data, the corresponding at least one wire being displayed as a color graphic corresponding to the identified color from the selected wiring data.

2. The computerized method of claim 1, wherein the generating an image includes providing a bitmap image of the wiring diagram.

3. The computerized method of claim 1, wherein the generating an image includes dynamically generating the image.

4. A system for displaying a wiring diagram of a vehicle, the system comprising:
    a display device for an automotive diagnostic tool, the display device being configured to display at least one wiring diagram image corresponding to a vehicle component and a vehicle module having at least one wire therebetween, the at least one wiring diagram image being configured so as to display the at least one wire as a color graphic;
    a storage device configured to store data corresponding to the at least one wiring diagram image;
    a processor coupled to the storage device and the display device, the processor being configured to control the display device for displaying the at least one wiring diagram image; and
    a user interface coupled to the processor, and wherein the storage device is configured to maintain a database of wiring data for vehicles, the wiring data identifying a vehicle component, a vehicle module, and at least one wire therebetween having a color, the database further identifying the color, and
    wherein further the user interface is configured for user selection of wiring data from the database for display such that the processor controls the display device to display the at least one wiring diagram image corresponding to the selected wiring data including the at least one wire being displayed as a color graphic corresponding to the identified color from the selected wiring data.

5. The system of claim 4, wherein the storage device is configured to store the data as a bitmap image.

6. The system of claim 4, wherein the processor is configured to dynamically generate the at least one wiring diagram image for display on the display device.

7. The system of claim 4, wherein the storage device and processor are coupled to a printing device configured for providing a color printout substantially corresponding to the at least one wiring diagram image.

8. The system of claim 4, further comprising an connector for connecting the system to a vehicle to exchange data therebetween, the connector being coupled to the display such that the at least one wiring diagram image correlates to the exchanged data.

9. A computer readable medium having computer-executable instructions for performing a computer process using the computer, the computer process comprising:
generating an image of a wiring diagram corresponding to a vehicle component and a vehicle module having at least one wire therebetween;
controlling a display for displaying the image, the at least one wire being displayed as a color graphic;
providing a database of wiring data for vehicles, the wiring data identifying a vehicle, a vehicle component, a vehicle module, and at least one wire therebetween having a color, the database further identifying the color;
selecting wiring data from the database for display; and
controlling the display device such that the displayed wiring diagram image corresponds to the selected wiring data including the at least one wire being displayed as a color graphic corresponding to the identified color from the selected wiring data.

10. The computer readable medium of claim 9, wherein the computer readable medium has stored thereon a data structure comprising:
a first field containing data representing a vehicle component;
a second field containing data representing a vehicle module;
a third field containing data representing a wire connection between the first and second fields; and
a fourth field containing data representing color derived from the third field.

11. The computer readable medium of claim 10, wherein controlling the display device includes converting the data of the fourth field into data for display as the color graphic.

12. The computer readable medium of claim 9, wherein selecting wiring data from the database for display includes providing a user interface to receive a user input and responding to the input so as to select the data.

13. The computer readable medium of claim 9, wherein selecting wiring data from the database for display includes receiving an input from a vehicle OBD interface so as to select the data.

14. The computer product of claim 9, wherein the computer readable medium is a CD, flash drive or storage device coupled to a network.

15. The computer readable medium of claim 9, wherein the computer readable medium is a storage device coupled to a scan tool.

16. A computerized method for displaying a wiring diagram of a vehicle in a display device of an automotive diagnostic tool, the method comprising:
generating an image of a wiring diagram corresponding to a vehicle component and a vehicle module having at least one wire therebetween;
controlling the display device so as to display the image, the at least one wire being displayed as a color graphic;
providing a database of wiring data for vehicles, the wiring data identifying the vehicle component, the vehicle module, and at least one wire therebetween having a color, the database further identifying the color; and
selecting wiring data from the database for display,
wherein the controlling the display device further includes controlling the device so as to display the image having the vehicle component, vehicle module and at least one wire therebetween corresponding to the selected wiring data, the corresponding at least one wire being displayed as a color graphic corresponding to the identified color from the selected wiring data, wherein providing a database of wiring data includes configuring the database for a plurality of vehicles and wherein further the selecting wiring data includes selecting wiring data corresponding to at least one of the plurality of vehicles.

* * * * *